United States Patent
Sambongi (10) Patent No.: US 8,305,468 B2
(45) Date of Patent: Nov. 6, 2012

(54) IMAGE ACQUISITION APPARATUS AND IMAGE ACQUISITION PROGRAM

(75) Inventor: Masao Sambongi, Tokyo (JP)

(73) Assignee: Olympus Corporation, Tokyo (JP)

( * ) Notice: Subject to any disclaimer, the term of this patent is extended or adjusted under 35 U.S.C. 154(b) by 313 days.

(21) Appl. No.: 12/710,421

(22) Filed: Feb. 23, 2010

(65) Prior Publication Data

US 2010/0231757 A1 Sep. 16, 2010

(30) Foreign Application Priority Data

Feb. 26, 2009 (JP) ................................. 2009-044875

(51) Int. Cl.
*H04N 5/217* (2006.01)
*H04N 5/235* (2006.01)
*H04N 9/083* (2006.01)
*H04N 5/222* (2006.01)
*H04N 2/235* (2006.01)

(52) U.S. Cl. .................... 348/241; 348/229.1; 348/289; 348/362; 348/333.11

(58) Field of Classification Search ............... 348/222.1, 348/229.1, 289, 362, 333.11, 241
See application file for complete search history.

(56) References Cited

U.S. PATENT DOCUMENTS

2005/0254707 A1* 11/2005 Takahashi ..................... 382/169
2009/0167905 A1* 7/2009 Ishibashi et al. .............. 348/241

FOREIGN PATENT DOCUMENTS

| JP | 2000/358190 | * 12/2000 |
| JP | 2000-358190 B2 | 12/2000 |
| JP | 2002-112108 A | 4/2002 |
| JP | 2007-324770 A | 12/2007 |

* cited by examiner

Primary Examiner — Nicholas Giles
Assistant Examiner — Stephen Coleman
(74) Attorney, Agent, or Firm — Holtz, Holtz, Goodman & Chick, PC (57) ABSTRACT

A plurality of preliminary image signals is acquired by carrying out preliminary image acquisition of a subject, before actual image acquisition, with different amounts of light received by an image acquisition device. Subsequently, a dynamic range and an amount of noise, or an S/N ratio, for a case in which the plurality of preliminary image signals is combined is calculated, and a received-light-level difference of the image acquisition device among a plurality of actual image signals acquired through the actual image acquisition is calculated on the basis of the dynamic range and the amount of noise, or the S/N ratio. Then, by carrying out the actual image acquisition on the basis of the calculated received-light-level difference, a plurality of actual image signals with different received light level is acquired. These actual image signals are combined to acquire a combined image.

10 Claims, 9 Drawing Sheets

IMAGE ACQUISITION APPARATUS AND IMAGE ACQUISITION PROGRAM

This application is based on Japanese Patent Application No. 2009-044875 filed Feb. 26, 2009, the content of which is incorporated herein by reference.

BACKGROUND OF THE INVENTION

1. Field of the Invention

The present invention relates to an image acquisition apparatus that acquires image signals associated with a plurality of images by carrying out image acquisition of the same subject multiple times and generates a combined image signal from the plurality of image signals.

2. Description of Related Art

In general, the dynamic range of various solid-state image-acquisition devices used for electronic cameras, such as CCD image sensors and CMOS-type image sensors, is small compared with the dynamic range of a subject. Thus, there is a problem in that overexposure occurs in high-luminance sections, and underexposure occurs in low-luminance sections. Accordingly, a method of generating an image having an expanded dynamic range by combining multiple image signals having different exposure levels into an image signal for one image has been proposed.

Japanese Unexamined Patent Application, Publication No. 2007-324770 discloses a method of acquiring an image with reduced noise by combining an image with short exposure time, high resolution, and a high level of noise and an image with long exposure time, low resolution, and a low level of noise.

Japanese Unexamined Patent Application, Publication No. 2002-112108 discloses a method of emphasizing the sharpness of image-acquisition signals, detecting the exposure ratio of image acquisition carried out multiple times, and combining the plurality of image-acquisition signals with emphasized sharpness depending on the exposure ratio.

BRIEF SUMMARY OF THE INVENTION

The present invention provides an image acquisition apparatus that is capable of increasing the dynamic range, and reducing noise, or improving the S/N ratio.

A first aspect of the present invention is an image acquisition apparatus including an image acquisition unit including an image acquisition device and configured to acquire a plurality of actual image signals by carrying out actual image acquisition of a subject and to acquire a plurality of preliminary image signals by carrying out preliminary image acquisition of the subject, before the actual image acquisition, with different amounts of light received by the image acquisition device; a dynamic-range calculating unit configured to calculate a dynamic range for a case in which the plurality of preliminary image signals is combined; a noise calculating unit configured to calculate an amount of noise or an S/N ratio for a case in which the plurality of preliminary image signals is combined; and a received-light-level-difference calculating unit configured to calculate a received-light-level difference of the image acquisition device between a plurality of actual image signals acquired during the actual image acquisition on the basis of the dynamic range, and the amount of noise or the S/N ratio.

A second aspect of the present invention is a recording medium on which an image acquisition program is recorded, the image acquisition program instructing a computer to execute a preliminary image signal input step of inputting a plurality of preliminary image signals acquired by carrying out preliminary image acquisition of a subject, before actual image acquisition, with different amounts of light received by an image acquisition device; a dynamic range calculating step of calculating a dynamic range for a case in which the plurality of preliminary image signals is combined; a feature value calculating step of calculating an amount of noise or an S/N ratio for a case in which the plurality of preliminary image signals is combined; and a received-light-level-difference calculating step of calculating a received-light-level difference of the image acquisition device among plurality of actual image signals acquired during the actual image acquisition on the basis of the dynamic range, and the amount of noise or the S/N ratio.

According to these aspects, the dynamic range can be increased, and noise can be reduced or the S/N ratio can be improved.

DETAILED DESCRIPTION OF THE INVENTION

Embodiments of the present invention will be described below with reference to the drawings.

First Embodiment

Figure 1:
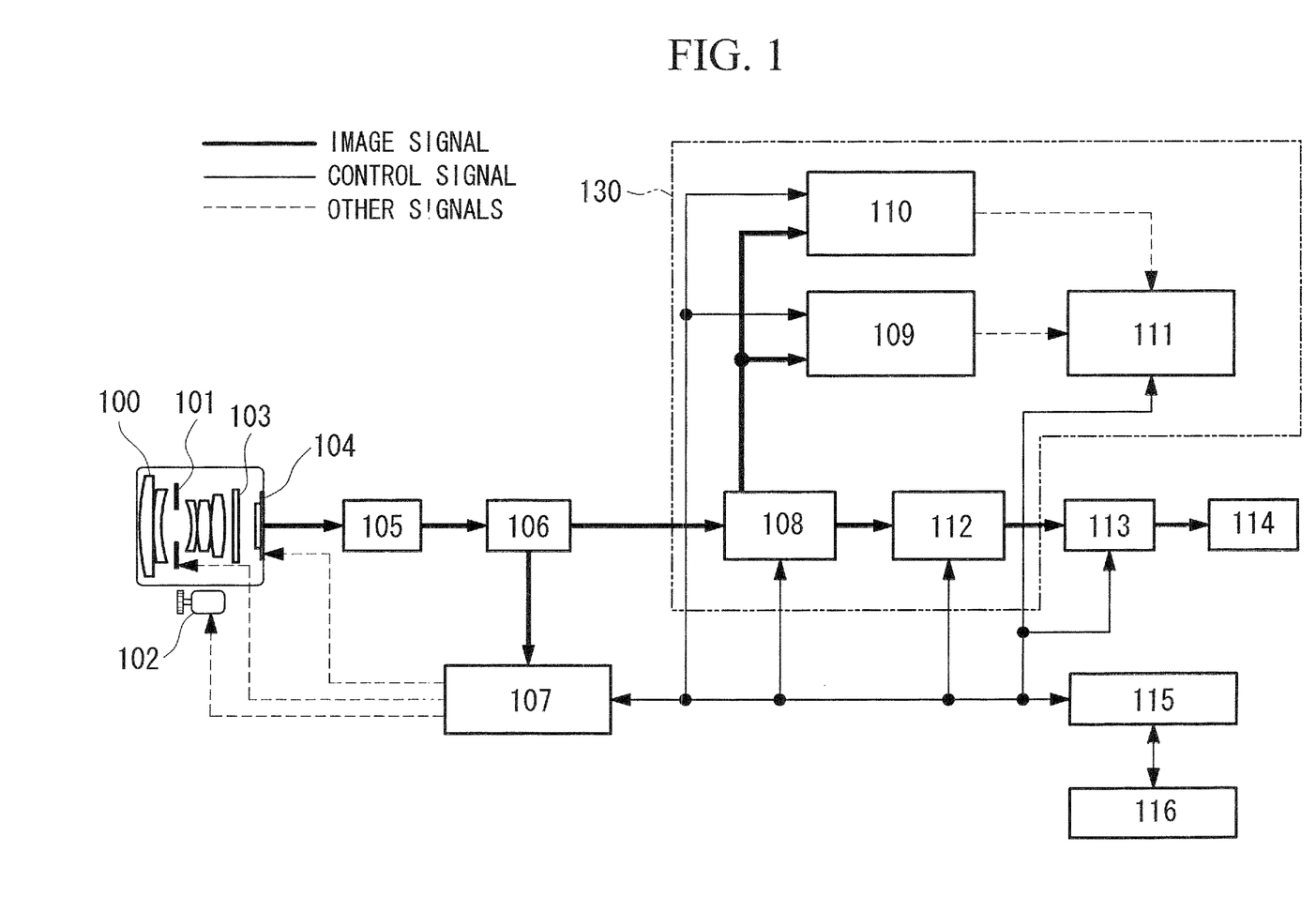
FIG. 1 is a block diagram illustrating, in outline, the configuration of an image acquisition apparatus according to a first embodiment of the present invention.

A first embodiment of the present invention will be described below with reference to the drawings. FIG. 1 is a block diagram illustrating, in outline, the configuration of an image acquisition apparatus according to this embodiment.

As illustrated in FIG. 1, the image acquisition apparatus according to this embodiment includes a lens system 100, an aperture 101, an AF motor 102, a color filter 103, a CCD 104, an A/D converting unit 105, a buffer 106, an image-acquisition control unit 107, an image processing unit 130, a compressing unit 113, an outputting unit 114, a control unit 115, and an external I/F unit 116.

The lens system 100 is positioned such that an image of a subject is formed through the aperture 101 and such that the image is formed on the CCD 104, which is an image acquisition device, through the color filter 103. The AF motor 102 is driven and controlled by the image-acquisition control unit 107, which is described below, and is driven such that the lens system 100 is focused on the subject in response to a control signal from the image-acquisition control unit 107. The CCD 104 generates electrical image information about an image of the subject formed by the lens system 100 and outputs this electrical image information to the A/D converting unit 105. In the description of this embodiment, the CCD 104 uses a single CCD of the RGB primary color system, and the gradation depth of the signal from the A/D converting unit 105 is M bits. At the A/D converting unit 105, image information generated at the CCD 104 is converted into an image signal, which is discretized digital data that can be processed in a predetermined manner by the image processing unit 130; the converted image signal is temporarily stored in the buffer 106; and then the signal is output from the buffer 106 to the image processing unit 130. The compressing unit 113 compresses the image signal processed in a predetermined manner by the image processing unit 130, which is described below, and outputs the signal to the outputting unit 116.

The image-acquisition control unit 107 controls the aperture 101, the electronic shutter speed of the CCD 104, and so on to adjust the received light level of the CCD 104 by using the luminance level in actual image signals or preliminary image signals or a luminance sensor (not shown) in accordance with the focusing condition and the exposure condition, such as the received light level of the CCD, in preliminary image acquisition and actual image acquisition. The difference in the amounts of light received by the CCD 104 during acquisition of a plurality of preliminary image signals is set in advance and stored in a memory (not shown). The amount of light received by the CCD during the actual image acquisition is determined on the basis of the received-light-level difference calculated by a received-light-level-difference calculating unit 111, which is described below. The control by the image-acquisition control unit 107 is carried out multiple times during both the preliminary image acquisition and the actual image acquisition; the actual image signals or preliminary image signals of a plurality of acquired images are temporarily stored in the buffer 106; and then the actual image signals or the preliminary image signals are sequentially output to the image processing unit 130 one by one in units equivalent to one image. The buffer 106 has a memory capacity large enough for storing the actual image signals and the preliminary image signals of this embodiment having an M-bit gradation depth in an amount equivalent to a predetermined number of images. Hereinafter, for the sake of convenience, it is assumed that preliminary image signals for two images are acquired by image acquisition.

The control unit 105 is bidirectionally connected to an image-acquisition control unit 117, a signal processing unit 108, which is described below, a dynamic-range calculating unit 109, a noise calculating unit 110, the received-light-level-difference calculating unit 111, an image combining unit 112, and a compressing unit 113, and drives and controls each of these components. The external I/F unit 118 has a power switch, a shutter button, and an interface for switching between various modes during image acquisition.

The image processing unit 130 includes the signal processing unit 108, the dynamic-range calculating unit 109, the noise calculating unit 110, the received-light-level-difference calculating unit 111, and the image combining unit 112.

The signal processing unit 108 reads the single-plane image signal input from the buffer 106 in response to the control of the control unit 115, carries out predetermined image processing, such as interpolation processing, white balance adjustment processing, electronic zoom processing, and noise suppression processing, and generates three-planer RGB image signals for each pixel. Moreover, the RGB signals may be converted to YCbCr signals using the following Equation 1.

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \quad [\text{Eq. 1}]$$

The generated image signals are output to the dynamic-range calculating unit 109, the noise calculating unit 110, and the image combining unit 112.

Figure 2:
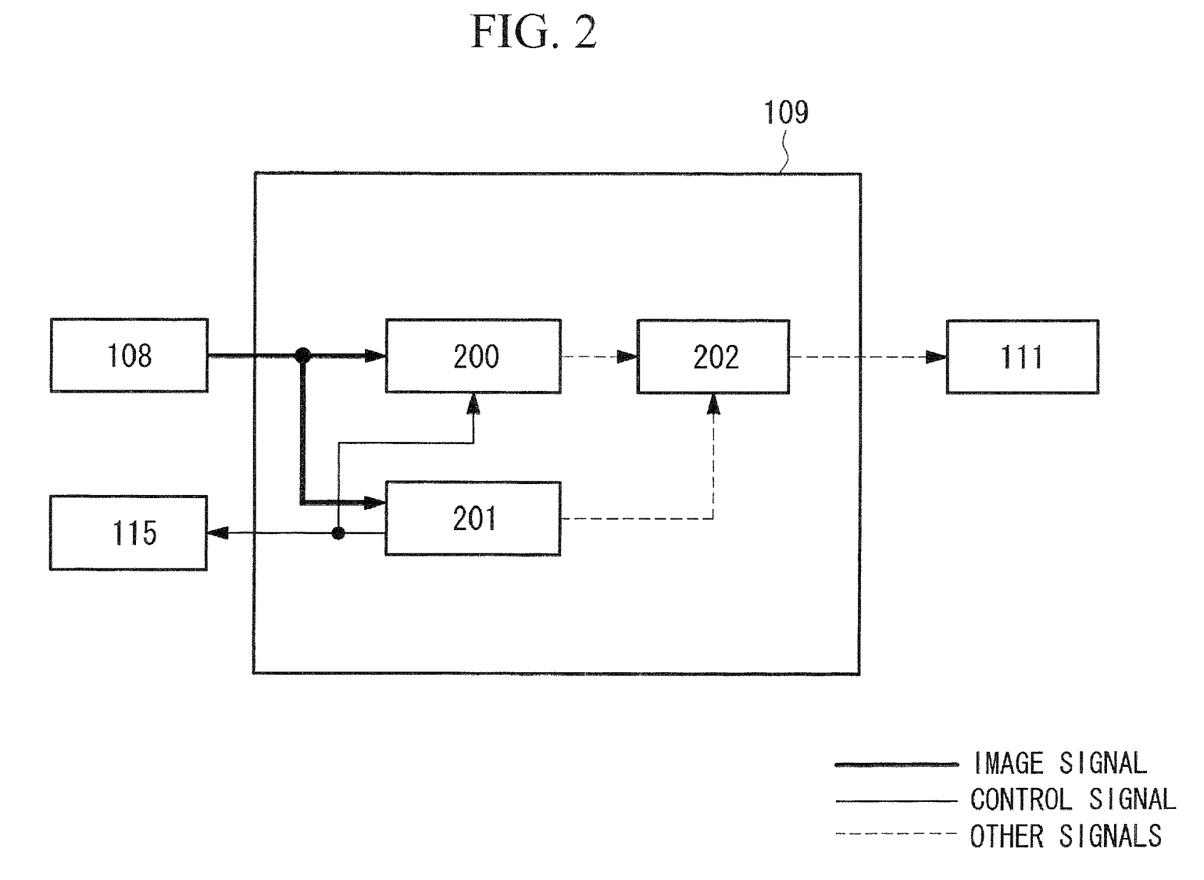
FIG. 2 is a block diagram illustrating, in outline, the configuration of a dynamic-range calculating unit of the image acquisition apparatus according to the first embodiment of the present invention.

The dynamic-range calculating unit 109 calculates a maximum pixel value and a minimum pixel value from a plurality preliminary image signals, i.e., two preliminary image signals in this embodiment, and, as illustrated in FIG. 2, includes a maximum-signal-value calculating unit 200, a minimum-signal-value calculating unit 201, and a calculating unit 202.

The maximum-signal-value calculating unit 200 calculates the maximum value of the preliminary image signals for two images transferred from the signal processing unit 108. Similarly, the minimum-signal-value calculating unit 201 calculates the minimum value of the preliminary image signals for two images transferred from the signal processing unit 108. The maximum value and the minimum value are calculated for G signals when the preliminary image signals are RGB signals and from Y signals when the preliminary image signals are YCbCr signals. In consideration of the saturation characteristics of sensors such as the CCD 104, an upper limit of approximately 90% of the maximum value of an image signal may be set as an effective upper limit, of the maximum value. In other words, when the number of bits of a preliminary image signal is 8, the upper limit of the maximum value of the preliminary image signal is 256, and the effective upper limit of the maximum value is approximately 230. Similarly, in consideration of the noise characteristics of sensors, a sum of the minimum value and a predetermined value may be set as the lower limit of the minimum value calculated by the minimum-signal-value calculating unit 201. For example, when the number of bits of a preliminary image signal is 8, the lower limit of the minimum value of the preliminary image signal is zero. The lower limit of the minimum value may be set to 10, which is sum of the minimum value 0 and a predetermined value 10. This predetermined value may be calculated on the basis of the noise characteristics, e.g., the standard deviation of the signal when the signal value is near zero.

With the maximum-signal-value calculating unit 200 and the minimum-signal-value calculating unit 201, the maximum value and the minimum value can be calculated from the preliminary image signals for two images. The maximum signal value and the minimum signal value, however, can be also calculated from a combined preliminary image signal that is generated from multiple preliminary image signals, i.e., two images in this embodiment.

The maximum-signal-value calculating unit 200 and the minimum-signal-value calculating unit 201 calculate BV values, defined in APEX units, from the calculated maximum value Vmax and minimum value Vmin, according to the following Equations 2.

$$BV_{max}^{ISO} = \log_2\left(\frac{F^2}{T}\right) + \log_2\left(j\frac{V_{max}}{k \cdot 2^{bit}}\right) - \log_2\left(\frac{ISO}{3.125}\right)$$

$$BV_{min}^{ISO} = \log_2\left(\frac{F^2}{T}\right) + \log_2\left(j\frac{V_{min}}{k \cdot 2^{bit}}\right) - \log_2\left(\frac{ISO}{3.125}\right)$$

[Eq. 2]

Here, BVISOmax and BVISOmin represent the maximum and minimum BV values, respectively, F represents the aperture, T represents the exposure time (seconds), and ISO represents the ISO speed. Additionally, bit represents the bit resolution when converting a signal to a digital signal, and j and k represent correction coefficients for when preliminary image signals are converted to BV values. Information about the aperture and the exposure time is transferred from the image-acquisition control unit 107 via the control unit 115. The maximum value BISO1,max and the minimum value BISO1,min of subject luminance for the maximum value and the minimum value of the image signal of a first image is calculated on the basis of the following Equations 3.

$$B^{ISO}_{1,max} = 2^{BV^{ISO}_{1,max}} \cdot N \cdot K$$

$$B^{ISO}_{1,min} = 2^{BV^{ISO}_{1,max}} \cdot N \cdot K$$

[Eq. 3]

Here, the maximum value BISO1,max and the minimum value BISO1,min respectively represent the maximum value and the minimum value of the BV values of the image signal for the first image, where N and K are constants. The output characteristic corresponding to the amount of light incident on the CCD 104 is known, and the relationship between the amount of incident light and the output is linearly corrected.

Similarly, the maximum value BISO2,max and the minimum value BISO2,min of the subject luminance are calculated for the preliminary image signal for the second image. Luminance ranges ΔB equivalent to the dynamic ranges are calculated from the subject luminance of the preliminary image signals for the first and second images, according to the following Equations 4.

$$\Delta B = B^{ISO}_{1,max} - B^{ISO}_{2,min}, B^{ISO}_{1,max} \geq B^{ISO}_{2,max} \text{ and}$$
$$B^{ISO}_{1,min} \geq B^{ISO}_{2,min}$$

$$\Delta B = B^{ISO}_{2,max} - B^{ISO}_{1,min}, B^{ISO}_{1,max} < B^{ISO}_{2,max} \text{ and}$$
$$B^{ISO}_{1,min} < B^{ISO}_{2,min}$$

[Eq. 4]

ΔB defined by the difference acquired through Equations 4 does not depend on the ISO speed.

Furthermore, as defined by the following Equations 5, the dynamic range DR may be calculated as a decibel value.

$$DR = 20\log_{10}\left(\frac{B_{1,max}}{B_{2,min}}\right),$$

$$B_{1,max} \geq B_{2,max} \text{ and } B_{1,min} \geq B_{2,min}$$

$$DR = 20\log_{10}\left(\frac{B_{2,max}}{B_{1,min}}\right),$$

$$B_{1,max} \geq B_{2,max} \text{ and } B_{1,min} \geq B_{2,min}$$

[Eq. 5]

The calculated dynamic range is transferred to the received-light-level-difference calculating unit 111.

Figure 3:
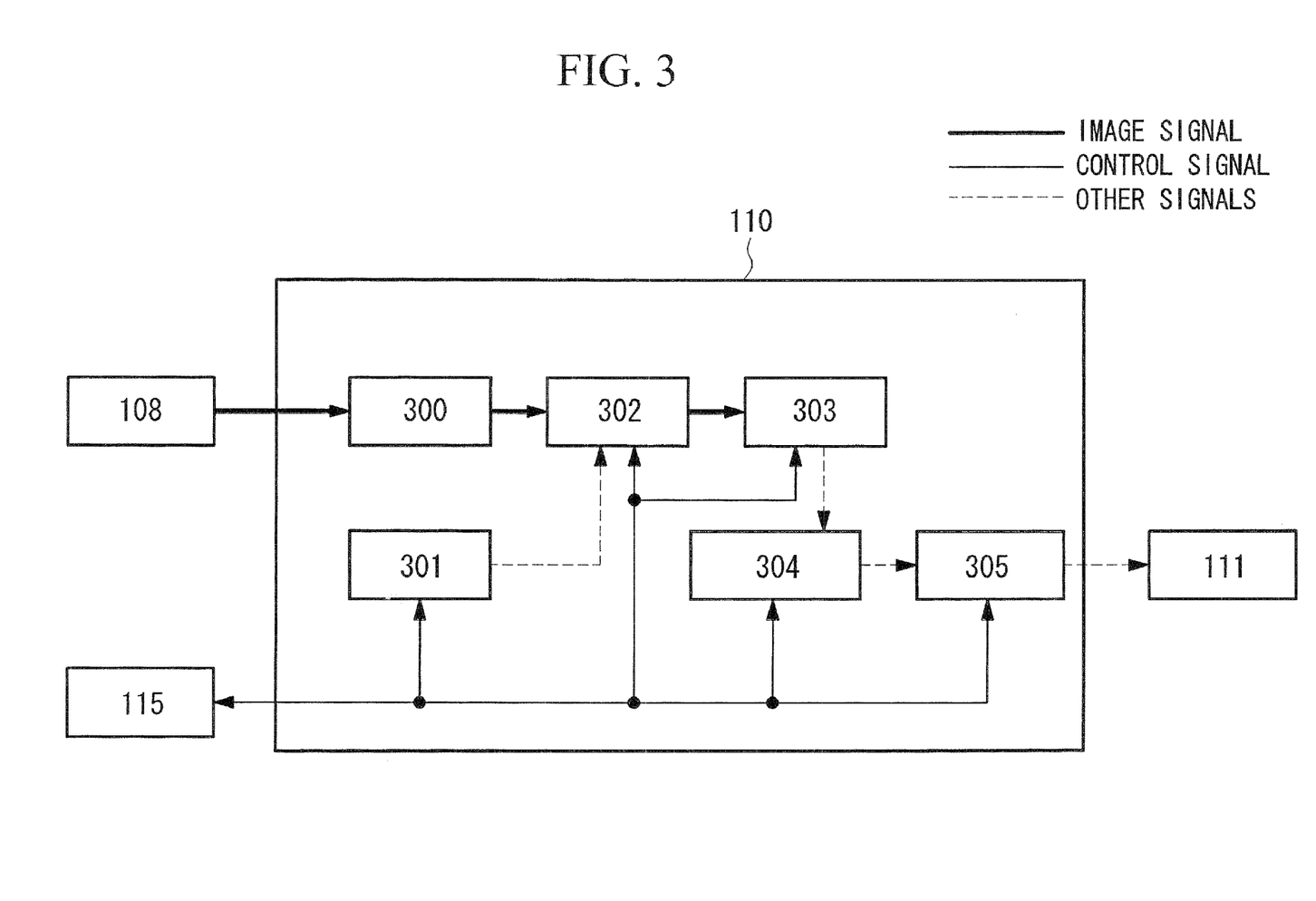
FIG. 3 is a block diagram illustrating, in outline, the configuration of a noise calculating unit of the image acquisition apparatus according to the first embodiment of the present invention.

The noise calculating unit 110 calculates the amount of noise as a feature value of a preliminary image signal and, from the amount of noise, calculates the S/N ratio, which is the ratio of the signal intensity to the noise intensity, and, as illustrated in FIG. 3, includes a buffer 300, a combining-ratio setting unit 301, a preliminary combining unit 302, an area extracting unit 303, a noise calculating unit 304, and a calculating unit 305.

The preliminary image signals for two images transferred from the signal processing unit 108 are stored in the buffer 300. According to the control of the control unit 115, the combining-ratio setting unit 301 sets a combining percentage, which is a combining ratio, of the preliminary image signals for two images stored in the buffer 300. More specifically, the combining ratio of the preliminary image signals for two images is set to 1:r in advance, and this value r is stored in the combining-ratio setting unit 301. Here, r is a real number greater than or equal to zero. The combining unit 302 calculates a signal value S' of a combined preliminary image signal on the basis of the combining ratio 1:r of the combining-ratio setting unit 301, according to the following Equation 6.

$$S' = (S_1 + rS_2)/(1+r)$$ [Eq. 6]

Here, S1 and S2 represent signal values of the preliminary image signals for the first and second images, respectively. Here, the signal values may be arbitrarily set for, for example, G signals of RGB signals or Y signals of YCbCr signals, as described above.

The area extracting unit 303 extracts a predetermined area centered on an arbitrary target pixel, e.g., a local area of 5×5, from the combined signal S'. Extraction of such an area may be carried out on the entire combined preliminary image signal S' or on only an area assigned by the operator. Information about the extracted local area is transferred to the noise calculating unit 304. The noise calculating unit 304 calculates the amount of noise in the combined signal S' using the information about the local area transferred from the area extracting unit 303. When the amount of noise in a target pixel I is represented by Ni, which is to be calculated, the amount of noise can be defined as a function of an average value S(−)'I of the signal values in the local area, according to the following Equation 7.

$$N_i = \alpha \bar{S}'^{\beta}_i + \gamma$$

Here, α, β, and γ are values depending on the CCD 104 and are constants defined in advance. The amount of noise Ni is not only calculated by the function defined by Equation 7; the amount of noise in an input signal can be calculated using a look-up table, or a standard deviation of the signal values in the local area can be set as the amount of noise. The noise calculating unit 304 calculates the amount of noise in each pixel in the combined signal S' and transfers the amount of noise in each pixel to the calculating unit 305.

The calculating unit 305 calculates the amount of noise in the entire combined signal S' using the amount of noise in each pixel transferred from the noise calculating unit 304. When the amount of noise in the entire combined signal is represented by N, the amount of noise N is calculated according to the following Equation 8.

$$N = \sum_{i}^{M} N_i / M \qquad [\text{Eq. 8}]$$

Here, M represents the total number of pixels. Calculation of the amount of noise is possible not only by calculation using simple addition, as in the above-described Equation 8, but also by increasing the weight in the area assigned by the photographer and calculating the amount of noise in the entire combined preliminary image signal.

Moreover, the S/N ratio, which is the ratio of signal intensity to noise intensity, is calculated on the basis of the calculated amount of noise N by the following Equation 9.

$$SN = 20\log\left(\frac{S'}{N}\right) \qquad [\text{Eq. 9}]$$

The calculated S/N ratio of the entire combined preliminary image signal is transferred to the received-light-level-difference calculating unit 111.

In this embodiment, the S/N ratio is calculated and used for computation at the received-light-level-difference calculating unit 111 as described below. The S/N ratio, however, does not necessarily have to be calculated; when the S/N ratio is not calculated, the amount of noise N may be used for computation at the received-light-level-difference calculating unit.

Figure 4:
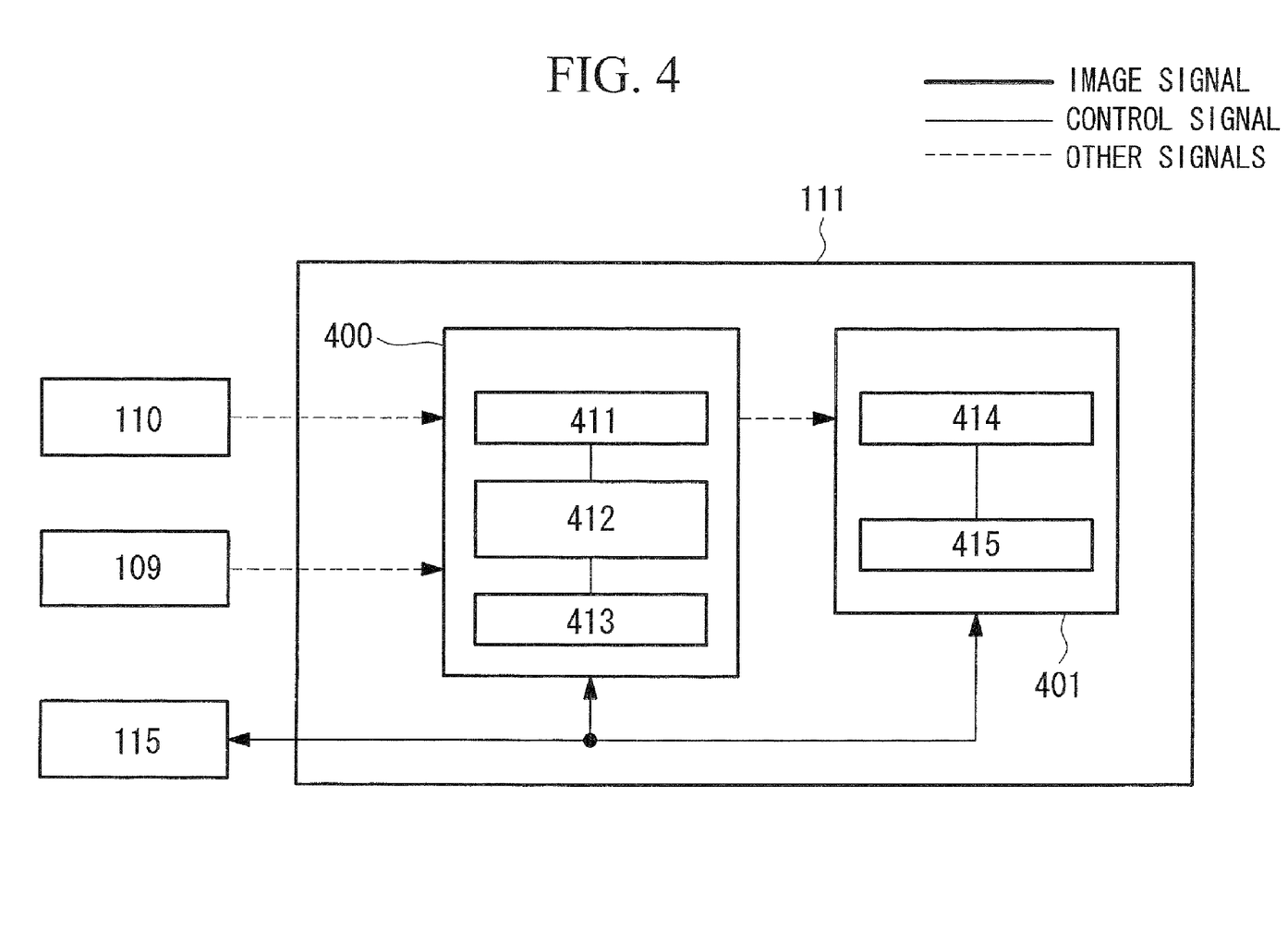
FIG. 4 is a block diagram illustrating, in outline, the configuration of a received-light-level-difference calculating unit of the image acquisition apparatus according to the first embodiment of the present invention.

The received-light-level-difference calculating unit 111 calculates the received-light-level difference of the image acquisition device when the multiple actual image signals are acquired through the actual image acquisition, on the basis of the dynamic range calculated at the dynamic-range calculating unit 109 and the S/N ratio calculated at the noise calculating unit 110. Thus, as illustrated in FIG. 4, the received-light-level-difference calculating unit 111 includes a weighting unit 400 and a calculating unit 401.

The weighting unit 400 receives the S/N ratio calculated at the noise calculating unit 110 and the dynamic ranges DR calculated at the dynamic-range calculating unit 109. In general, when an image includes many dark sections, noise is prominent, and it is necessary to reduce the noise. On the other hand, when an image includes many bright sections, the dynamic range needs to be increased. Thus, when the amounts of light received by the image acquisition device through the actual image acquisition are determined, the weighting unit 400 carries out weighting processing on the input dynamic range and the S/N ratio on the basis of the dynamic range or the S/N ratio of the preliminary image signals to determine what is to be prioritized: increasing the dynamic range or reducing the noise. Thus, as illustrated in FIG. 4, the weighting unit 400 includes an area extracting unit 411, a weighting-coefficient calculating unit 412, and a processing unit 413.

The area extracting unit 411 extracts the area of the bright sections and the area of the dark sections in the combined preliminary image signal. The area of the bright sections and the area of the dark sections are determined as follows. The area of the bright sections is defined by the number of pixel values ranging from the maximum value of the combined preliminary image signal to a predetermined value set in advance, whereas the area of the dark sections is defined by the pixel values ranging from the minimum value of the combined preliminary image signal to a predetermined value set in advance. Here, the predetermined values for the bright sections and the dark sections can be determined by taking into consideration the saturation characteristics and the noise characteristics of the CCD 104, respectively. Here, a method of calculating the areas of bright sections and dark sections in the combined preliminary image signal is described. Instead, however, the areas of bright sections and dark sections may be calculated from the plurality of image signals before combining. When the aperture is constant, the area of the bright sections can be calculated from the image signal having the longest exposure time, whereas the area of the dark sections can be calculated from the image signal having the shortest exposure time.

The weighting-coefficient calculating unit 412 calculates a weighting coefficient on the basis of the area of the bright sections and the area of the dark sections extracted by the area extracting unit and outputs the calculated result to the processing unit 413. For example, when the entire area of the combined preliminary image signal is Ot, the areas of the bright sections and the dark sections in Ot are Ol and Od, respectively, the weighting coefficient for the dynamic ranges is Ol/Ot, and the weighting coefficient for the S/N ratio is Od/Ot.

The processing unit 413 carries out weighting processing by calculating an S/N ratio SN' and a dynamic range DR' after weighting using the weighting coefficient calculated by the weighting-coefficient calculating unit 412. The S/N ratio SN' and the dynamic range DR' after weighting are calculated by carrying out computation according to the following Equations 10, and the calculated results are output to the calculating unit 401.

$$DR' = \frac{O_l}{O_t} DR \qquad [\text{Eq. 10}]$$
$$SN' = \frac{O_d}{O_t} SN$$

The calculating unit 401 determines the optimal received-light-level difference for acquiring multiple images through the actual image acquisition on the basis of DR' and SN' transferred from the weighting unit 400. In other words, the calculating unit 401 carries out computation based on the Equations 10, which are presented above, multiple times to generate approximate curves, such as those illustrated in FIG. 5, for example. Thus, the calculating unit 401 includes an approximate-curve generating unit 414 and an intersection calculating unit 415.

Figure 5:
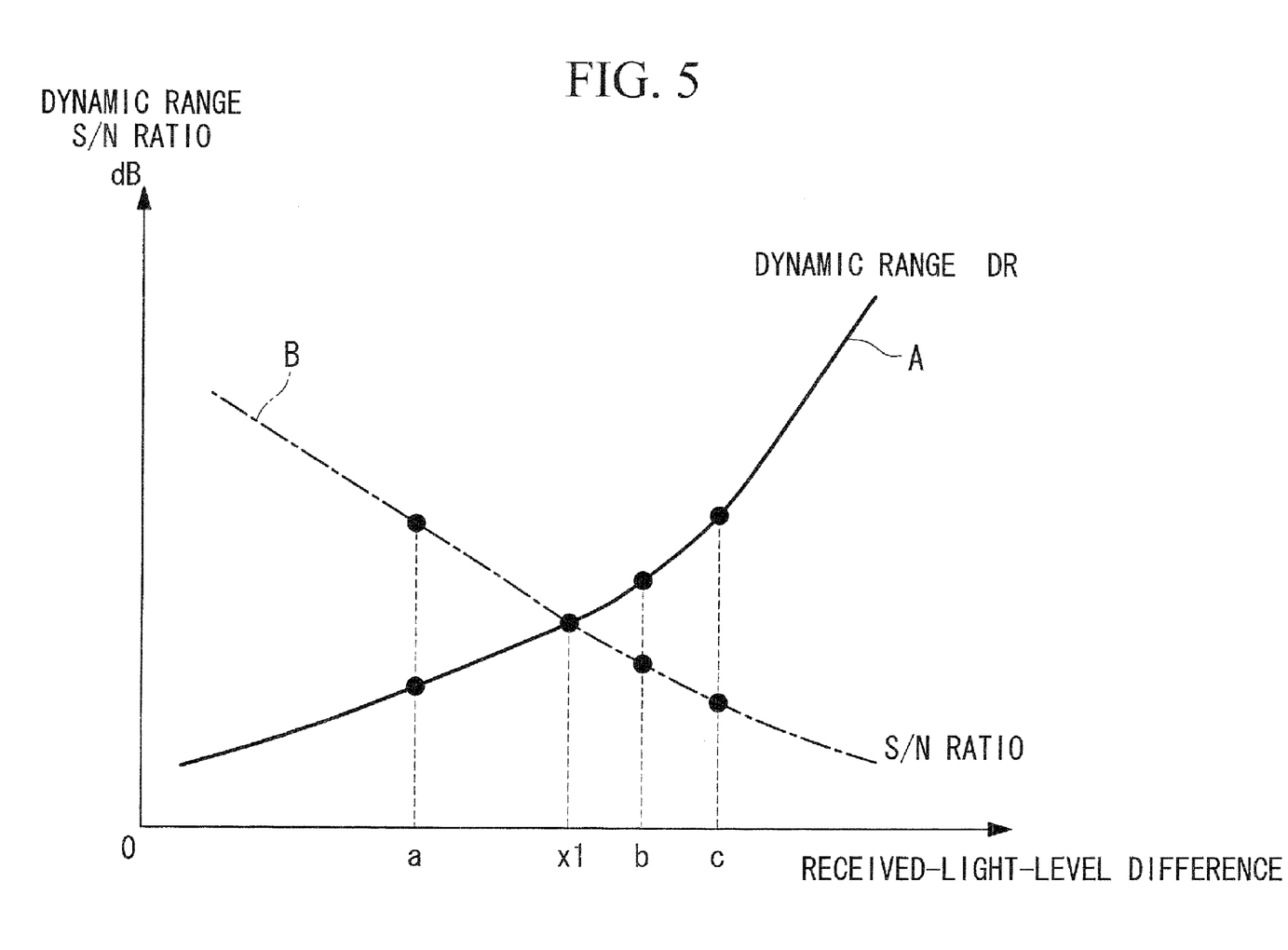
FIG. 5 is an explanatory diagram illustrating an example in which the received-light-level-difference calculating unit of the image acquisition apparatus according to the first embodiment of the present invention generates an approximate curve of the dynamic range vs. the received light level difference and an approximate curve of the S/N ratio vs. the received light level difference.

FIG. 5 illustrates an example in which preliminary image acquisition for acquiring image signals for two images is carried out three times (a, b, and c). In FIG. 5, the horizontal axis represents the received-light-level difference when two images are acquired, and the vertical axis represents decibel values, i.e., dynamic range or S/N value. The dynamic range and the S/N ratio are calculated from the received-light-level difference during three image acquisition attempts (a, b, and c) and the preliminary image signals acquired through the three image acquisition attempts (a, b, and c) with different received light levels. Then, the dynamic range and S/N ratio at the weighting unit 400, the dynamic range DR' and S/N ratio SN' after weighting are calculated according to Equations 10. Then, the approximate-curve generating unit 414 plots the computed results and generates an approximate curve A of the dynamic range vs. the received-light-level difference and an approximate curve B of the S/N ratio vs. the received-light-level difference from the plotted points by quadratic curve interpolation, spline interpolation, etc.

As illustrated in FIG. 5, as the received-light-level difference becomes large, the dynamic range of an image signal becomes large but the S/N ratio becomes small, and the effect of noise reduction by combining signals is reduced. In contrast, as the received-light-level difference becomes small, the dynamic range of an image signal becomes small but the S/N ratio becomes large, and the effect of noise reduction by combining signals increases.

In other words, because the effect of increasing the dynamic range and the effect of reducing noise are in a trade-off relationship, it is necessary to calculate an optimal received-light-level difference by taking both effects into consideration. Therefore, both the dynamic range and the S/N ratio are taken into consideration, and the intersection calculating unit 415 calculates the intersection of an approximate curve of the dynamic range vs. the received-light-level difference and an approximate curve of the S/N ratio vs. the received-light-level difference. The received-light-level-difference calculating unit 111 calculates the received-light-level difference at this intersection as the received-light-level difference received by the image acquisition device among the plurality of actual image signals acquired through the actual image acquisition. In FIG. 5, an intersection x1 of the approximate curve A of the dynamic range vs. the received-light-level difference and an approximate curve B of the S/N ratio vs. the received-light-level difference is calculated as the optimal received-light-level difference.

In this description, preliminary image acquisition for two images with different received light level is carried out three times. It is, however, also possible to carry out the above-described computation on the basis of, for example, the difference in exposure of two images arbitrarily extracted from the acquired image signals for three images with different received light level.

The optimal received-light-level difference x1 is transferred to the image-acquisition control unit 107 via the control unit 115. The image-acquisition control unit 107 carries out the actual image acquisition according to the optimal received-light-level difference x1 transferred from the control unit 115 and acquires actual image signals for two images with different received light level. The actual image signals for two images are temporarily stored in the buffer 106, and signal processing is carried out on each image at the signal processing unit 108. The actual image signals on which signal processing is carried out are transferred to the image combining unit 112.

The image combining unit 112 combines the actual image signals for two images transferred from the signal processing unit 108. Alignment of the image signals for two images is already carried out by matching, etc. using known motion vectors. Next, the signal values at the same coordinates are combined in the image signals for two images. The combining method may be simple addition or may be weighted addition as defined by the following Equation 11.

$$I'=(1-\alpha)I_1+(1+\alpha)I_2 \quad [\text{Eq. 11}]$$

Figure 6:
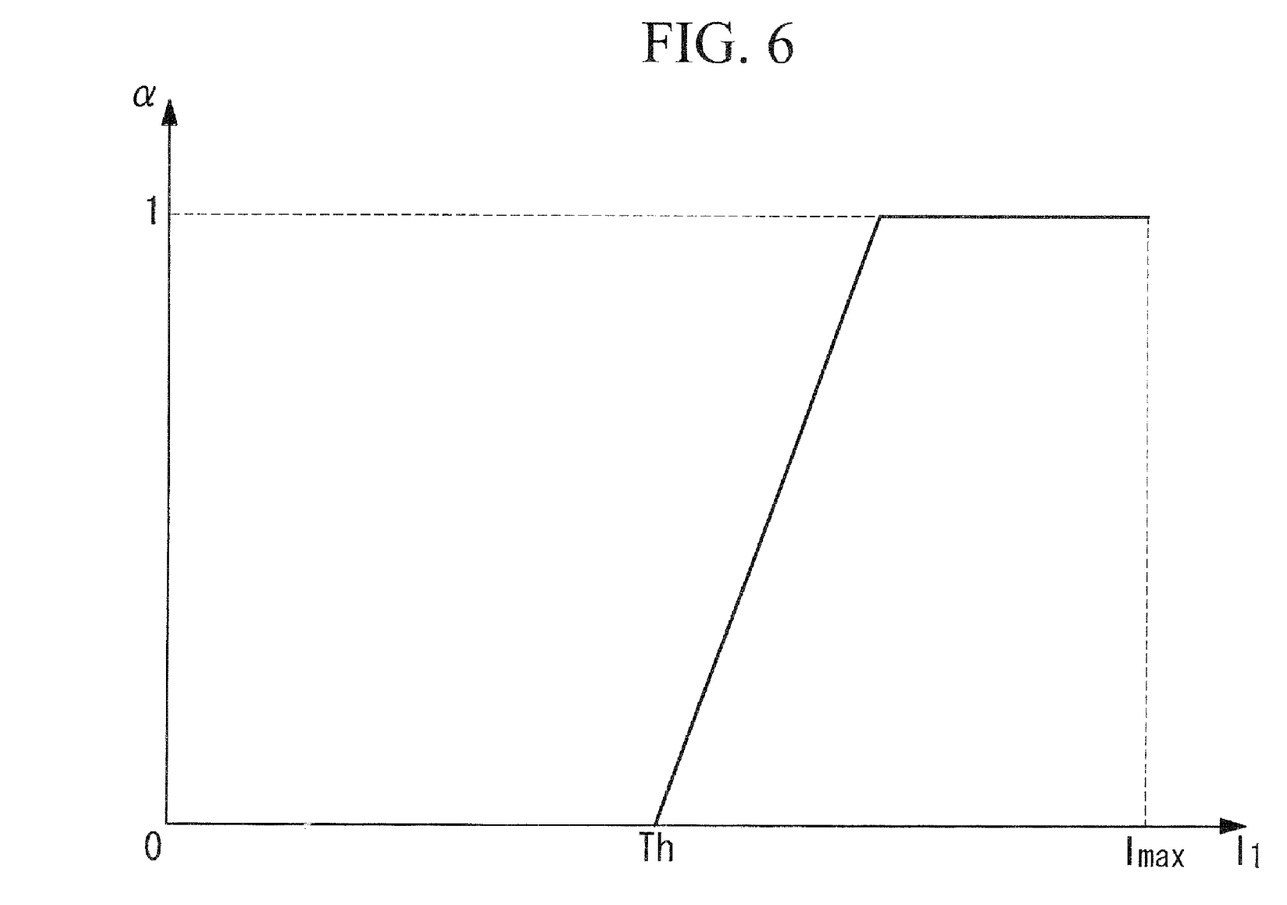
FIG. 6 is an explanatory diagram related to a weighting coefficient for a case in which image signals are combined at the image acquisition apparatus according to the first embodiment of the present invention.

Here, I' represents a signal after combining, I1 and I2 represent signals of the first and second images, respectively, and α represents a weighting coefficient. The weighting coefficient α is represented as a function of the input signal I1 for the first image, as illustrated in FIG. 6. By using such a weighting coefficient, addition taking into consideration the saturated part of the signals is possible. The signals to be added are not limited to RGB signals and may be any other type of signals, such as YCbCr signals. The image signal combined at the image combining unit 112 is transferred to the compressing unit 113 for JPEG compression, etc. and is transferred to the outputting unit 114, such as a memory card.

Figure 7:
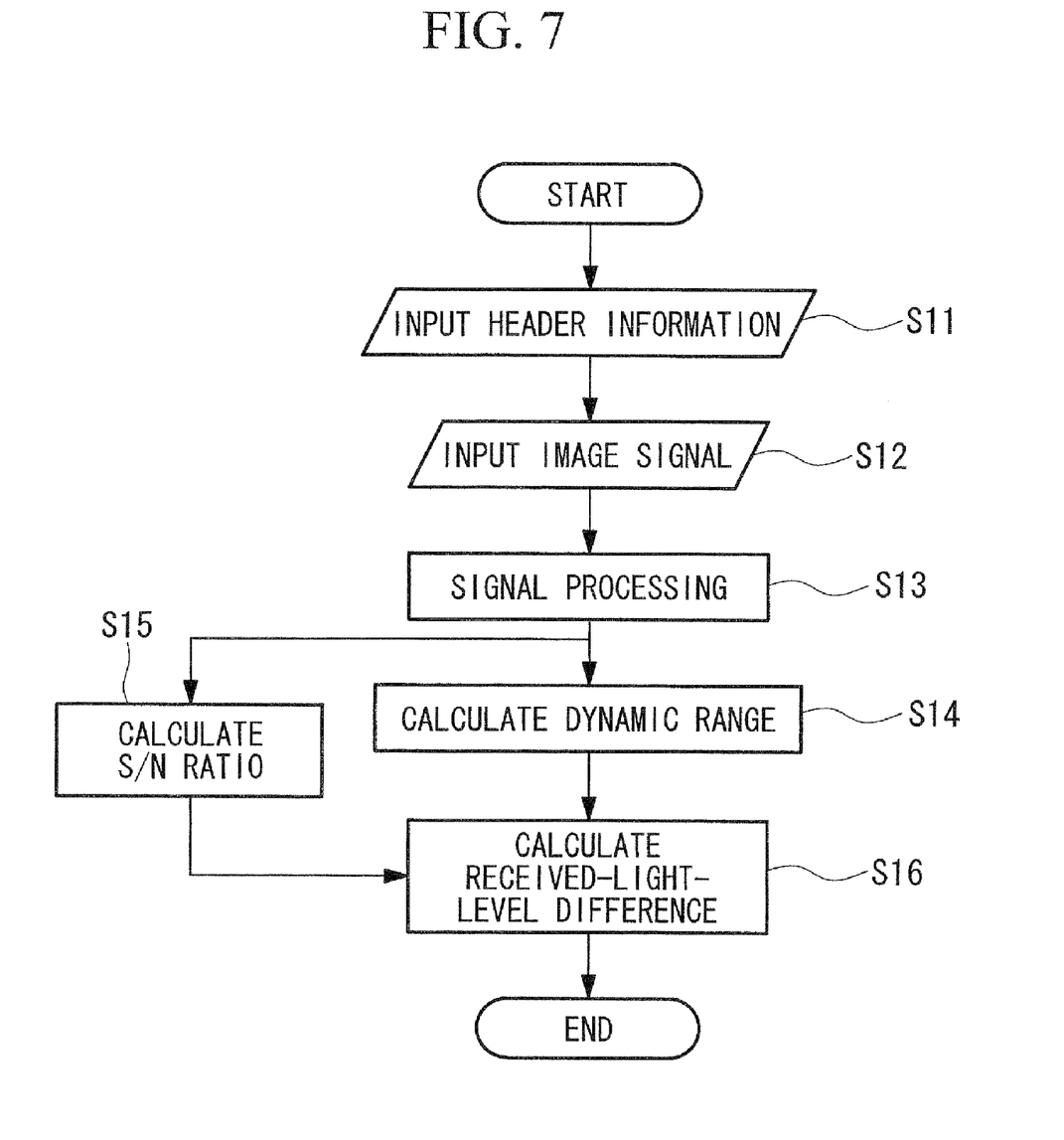
FIG. 7 is a flow chart illustrating the process of received-light-level-difference calculation processing carried out in the image acquisition apparatus according to the first embodiment of the present invention.

The process of the received-light-level difference calculation processing by an image acquisition apparatus according to the present invention, which is configured as described above, will be described below with reference to the flow chart illustrated in FIG. 7.

After image-acquisition conditions, such as ISO speed and exposure, are set via an external I/F unit 118, the image acquisition apparatus enters a preliminary-image-acquisition mode by pressing a shutter button (not shown) halfway. In Step S11, an image signal from the CCD 104 is read as raw data, which includes the ISO speed information, image signal size, and so on read as header information, and then the process proceeds to Step S12. In Step S12, the two preliminary image signals acquired by preliminary image acquisition through the lens system 100, the aperture 101, the color filter 103, and the CCD 104 are converted to digital image signals at the A/D converting unit 105 and are input to the buffer 106. In Step S13, signal processing, such as interpolation processing, white balance adjustment processing, Y/C signal generation processing, electronic zoom processing, and noise suppression processing, are carried out by the signal processing unit 108, and then the process goes to Step S14.

In Step S14, the dynamic range when the preliminary image signals for two images are combined is calculated by the dynamic-range calculating unit 109. In other words, the maximum pixel value and the minimum pixel value are calculated from the preliminary image signals for two images, and, on the basis of these, the dynamic range for a case in which the preliminary image signals are combined is calculated. The calculated dynamic range is output to the received-light-level-difference calculating unit 111, and the process proceeds to Step S16. Simultaneous with Step S14, in Step S15, the S/N ratio when the preliminary image signals for two images are combined is calculated by the noise calculating unit 110. As described above, the calculation of the S/N ratio is carried out by generating a preliminary combined image signal by combining the preliminary image signals for two images on the basis of a predetermined combining ratio, calculating the amount of noise by extracting an arbitrary local area from this preliminary combined image signal, calculating the amount of noise in the entire preliminary combined image signal on the basis of the amount of noise in the local area, and then calculating the S/N ratio. The calculated S/N ratio is output to the received-light-level-difference calculating unit 111, and the process goes to Step S16.

In Step S16, the suitable received-light-level difference for the actual image acquisition is calculated by the received-light-level-difference calculating unit 111. In other words, the received-light-level-difference calculating unit 111 carries out weighting processing on the previously calculated dynamic range and S/N ratio, generates an approximate curve A of the dynamic range vs. received-light-level difference and an approximate curve B of the S/N ratio vs. the received-light-level difference, and calculates an intersection x1 of the curves as the received-light-level difference by the CCD 104 when multiple image signals are acquired during actual image acquisition. The above-described processing by the image acquisition apparatus according to this embodiment is thus completed.

The calculated received-light-level difference is fed back to the image-acquisition control unit 107 via the control unit 115, and the image-acquisition control unit 107 acquires the plurality of image signals by carrying out the actual image acquisition according to this difference in the received light level.

As described above, by calculating the received-light-level difference while taking the dynamic range and the amount of noise into consideration, the actual image acquisition can be carried out with a suitable received-light-level difference. Furthermore, by combining multiple image signals acquired through the actual image acquisition with the calculated received-light-level difference, image signals associated with high-quality images capable of increasing the dynamic range and reducing noise, or improving the S/N ratio, can be acquired.

Second Embodiment

A second embodiment of the present invention will be described below with reference to the drawings.

Figure 8:
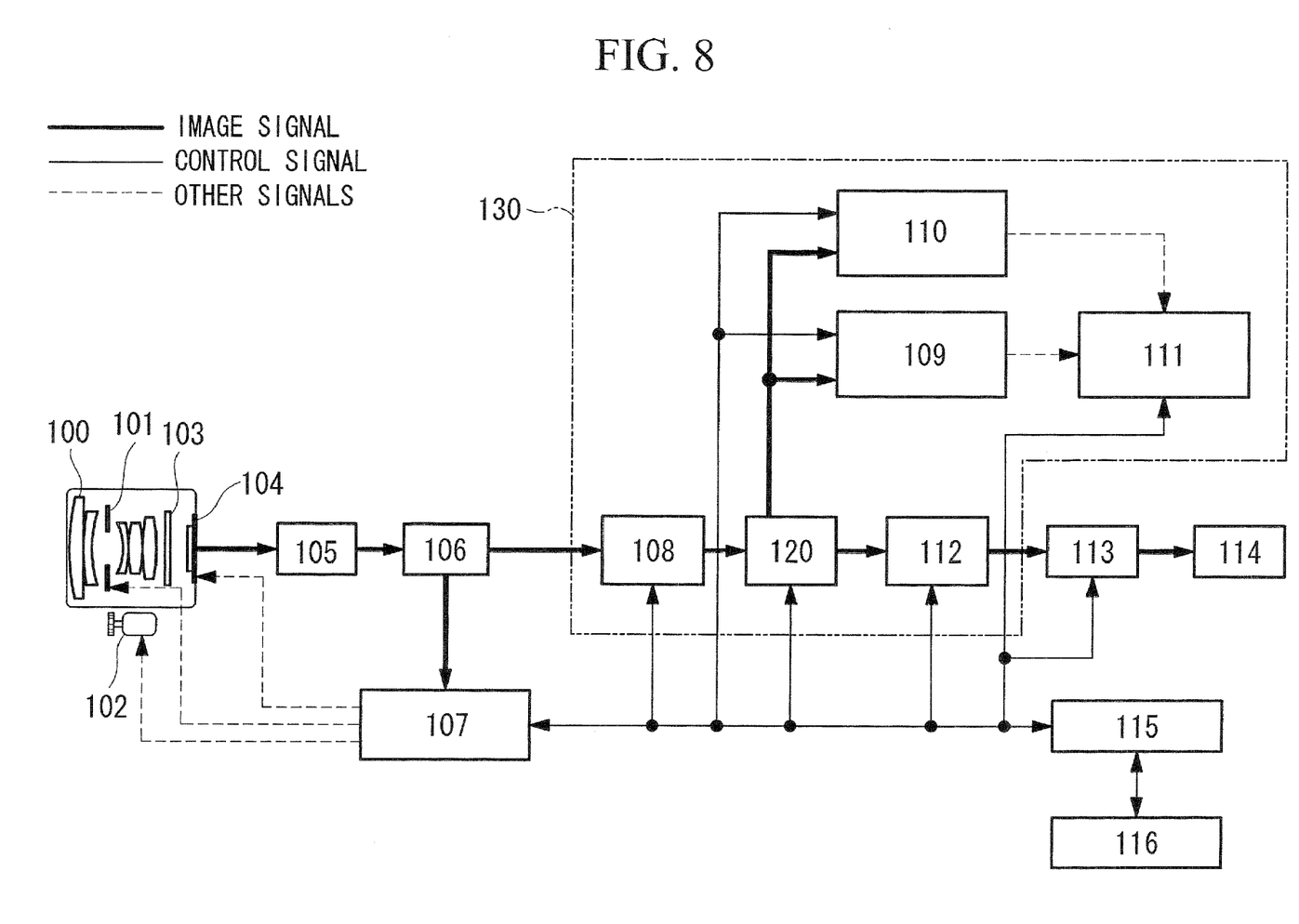
FIG. 8 is a block diagram illustrating, in outline, the configuration of an image acquisition apparatus according to a second embodiment of the present invention.

As shown in FIG. 8, in an image acquisition apparatus according to this embodiment, the configuration of an image processing unit 130 differs from the configuration of the image processing unit 130 of the image acquisition apparatus according to the above-described first embodiment. In other words, in the image processing unit 130, a transform unit 120 is provided; tone conversion processing is carried out on actual image signals and preliminary image signals input from a signal processing unit 108; and the image signals on which the tone conversion processing is carried out are output to a dynamic-range calculating unit 109, a noise calculating unit 110, and an image combining unit 112.

The tone conversion characteristic to be used during the tone conversion processing takes into consideration the output medium. For example, when output is to a liquid crystal display, a gamma characteristic of the display is used, whereas when output is to a printer, the output characteristic of ink is used. Moreover, the tone conversion characteristic may be a function of input signals, such as gamma correction, or may be arbitrarily set by a look-up table for the input signals. The configurations of components other than the transform unit 120 are the same as those in the first embodiment, and thus the same reference numerals are used and descriptions thereof are omitted.

Figure 9:
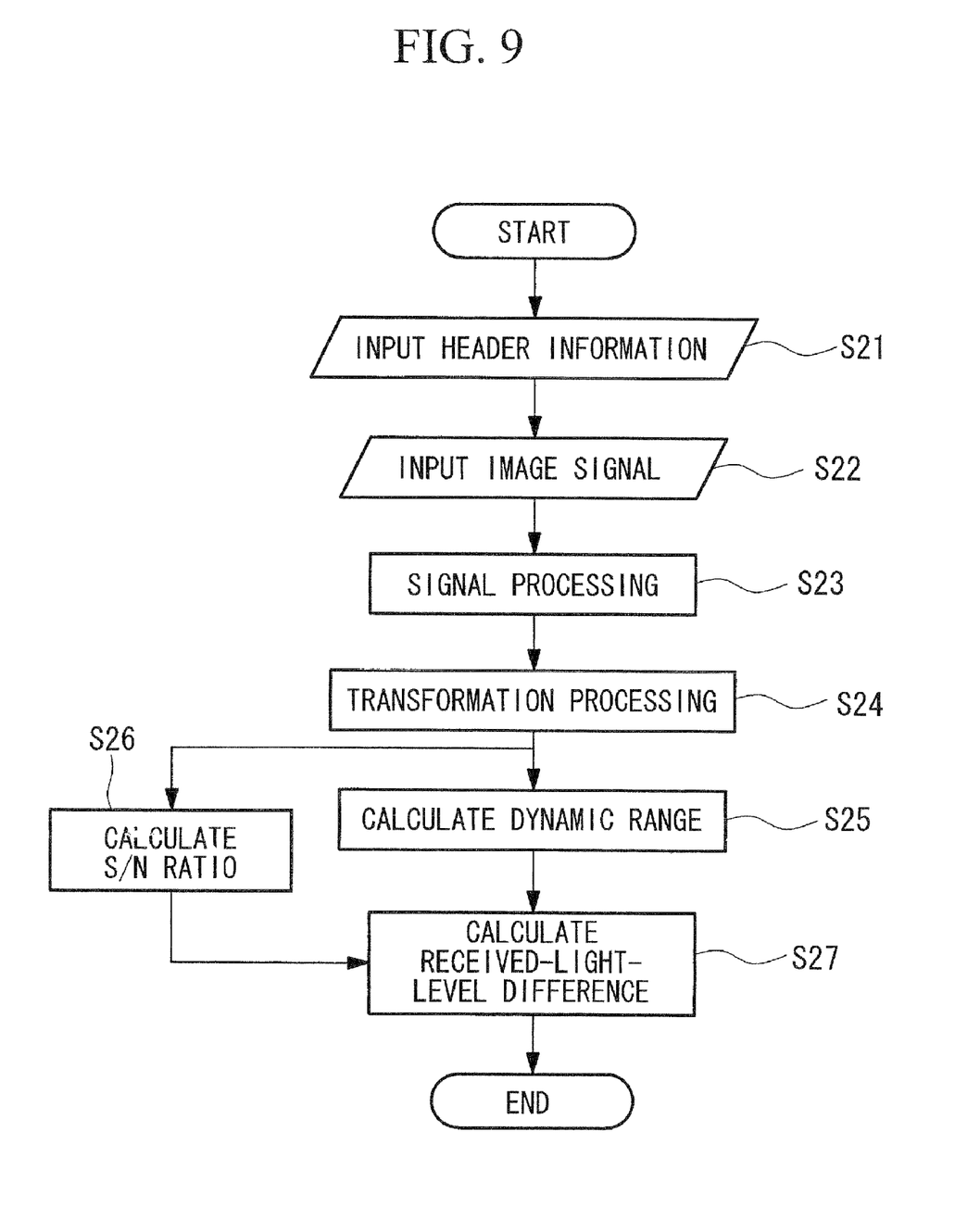
FIG. 9 is a flow chart illustrating the process of received-light-level-difference calculation processing carried out in the image acquisition apparatus according to the second embodiment of the present invention.

The process of calculation processing of the received-light-level difference in the image acquisition apparatus having the transform unit 120 according to this embodiment is described with reference to the flow chart in FIG. 9.

After image-acquisition conditions, such as ISO speed and exposure, are set via an external I/F unit 118, the image acquisition apparatus enters a preliminary-image-acquisition mode by pressing a shutter button (not shown) halfway. In Step S21, an image signal from the CCD 104 is read as raw data, which includes the ISO speed information, image signal size, and so on read as header information, and then the process goes to Step S22. In Step S22, the image signals 51 and S2 acquired by preliminary image acquisition through the lens system 100, the aperture 101, the color filter 103, and the CCD 104 are converted to digital image signals at the A/D converting unit 105 and are input to the buffer 106. In Step S23, signal processing, such as interpolation processing, white balance adjustment processing, Y/C signal generation processing, electronic zoom processing, and noise suppression processing, are carried out by the signal processing unit 108, and then the process proceeds to Step S24. In Step S24, tone conversion processing is carried out on a preliminary image signal input from the signal processing unit 108; the transformed preliminary image signal is output to the noise calculating unit 110 and the dynamic-range calculating unit 109; and then the process proceeds to Step S25.

In Step S25, the dynamic range when the gradation-transformed preliminary image signals for two images are combined is calculated by the dynamic-range calculating unit 109. In other words, the maximum pixel value and the minimum pixel value are calculated from the preliminary image signals for two images, and, on the basis of these, the dynamic range for a case in which the preliminary image signals are combined is calculated. The calculated dynamic range is output to the received-light-level-difference calculating unit 111, and the process goes to Step S27. Simultaneous with Step S25, in Step S26, the S/N ratio of when the preliminary image signals for two images are combined is calculated by the noise calculating unit 110. As described above, the calculation of the S/N ratio is carried out by generating the preliminary combined image signal by combining the preliminary image signals for two images on the basis of a predetermined combining ratio, calculating the amount of noise by extracting an arbitrary local area from this preliminary combined image signal, calculating the amount of noise in the entire preliminary combined image signal on the basis of the amount of noise in the local area, and then calculating the S/N ratio. The calculated S/N ratio is output to the received-light-level-difference calculating unit 111, and the process goes to Step S27.

In Step 027, the suitable received-light-level difference for the actual image acquisition is calculated by the received-light-level-difference calculating unit 111. In other words, the received-light-level-difference calculating unit 111 carries out weighting processing on the previously calculated dynamic range and S/N ratio, generates, on the basis of the result, an approximate curve A of the dynamic range vs. the received-light-level difference and an approximate curve B of the S/N ratio and the received-light-level difference, and calculates an intersection x1 of the curves as the received-light-level difference of the CCD 104 when multiple image signals are acquired through the actual image acquisition. The above-described processing by the image acquisition apparatus according to this embodiment is thus completed.

The calculated received-light-level difference is fed back to the image-acquisition control unit 107 via the control unit 115, and the image-acquisition control unit 107 acquires the multiple actual image signals by carrying out actual image acquisition according to this received-light-level difference.

As described above, by calculating the received-light-level difference while taking the dynamic range and the amount of noise into consideration, the actual image acquisition can be carried out with a preferable received-light-level difference. Furthermore, by combining multiple image signals acquired through the actual image acquisition with the calculated received-light-level difference, image signals associated with high-quality images capable of increasing the dynamic range and reducing noise, or improving the S/N ratio, can be acquired. Furthermore, since the dynamic range and the amount of noise are calculated in consideration of the received-light-level difference and on the basis of image signals on which tone conversion is carried out in consideration of the output medium, image signals that are suitable for the output medium can be acquired through the actual image acquisition.

The above-described embodiments assume processing by hardware. The present invention, however, is not limited to such a configuration. Instead, for example, a configuration for processing by separate software is also possible. In such a case, the image acquisition apparatus includes a CPU and a main storage device, such as RAM, and a computer-readable recording medium on which a program for realizing the entire process or part of the process is recorded. Then, by the CPU reading out the program recorded in the above-mentioned storage medium and carrying out processing and computation on the information, the same processing as that is realized by the above-described image acquisition apparatus is realized.

Here, the computer-readable recording medium is a magnetic disk, a magnetooptic disk, a CD-ROM, a DVD-ROM, a semiconductor memory, etc. Furthermore, this computer program may be distributed to a computer through a communication line, and the computer may execute the program upon receiving it.

What is claimed is:

1. An image acquisition apparatus comprising:
   an image acquisition unit which includes an image acquisition device and is configured to acquire a plurality of actual image signals by carrying out actual image acquisition of a subject and to acquire a plurality of preliminary image signals by carrying out preliminary image acquisition of the subject, before the actual image acquisition, with different amounts of light received by the image acquisition device;
   a dynamic-range calculating unit configured to calculate a dynamic range for a case in which the plurality of preliminary image signals are combined;
   a noise calculating unit configured to calculate an amount of noise or an S/N ratio for the case in which the plurality of preliminary image signals are combined; and
   a received-light-level-difference calculating unit configured to calculate a received-light-level difference of the image acquisition device between a plurality of actual image signals acquired during the actual image acquisition based on the dynamic range and the amount of noise or the S/N ratio;
   wherein the received-light-level-difference calculating unit includes:
      an approximate-curve generating unit configured to generate a first approximate curve of the dynamic range versus the received-light-level difference and a second approximate curve of the S/N ratio versus the received-light-level difference; and
      an intersection calculating unit configured to calculate an intersection of the first approximate curve and the second approximate curve; and
   wherein the received-light-level-difference calculating unit calculates the received-light-level difference at the intersection as the received-light-level difference of the image acquisition device among the plurality of actual image signals acquired during the actual image acquisition.

2. The image acquisition apparatus according to claim 1, further comprising:
   a transform unit configured to carry out tone conversion processing on the preliminary image signals;
   wherein the dynamic-range calculating unit calculates the dynamic range for a case in which the plurality of preliminary image signals are combined after tone conversion by the transform unit, and
   wherein the noise calculating unit calculates the amount of noise or the S/N ratio for the case in which the plurality of preliminary image signals are combined after the tone conversion by the transform unit.

3. The image acquisition apparatus according to claim 1, wherein the dynamic-range calculating unit includes:
   a maximum-signal-value calculating unit configured to calculate a maximum signal value based on the plurality of preliminary image signals; and
   a minimum-signal-value calculating unit configured to calculate a minimum signal value based on the plurality of preliminary image signals; and
   wherein the dynamic-range calculating unit calculates the dynamic range for the case in which the plurality of preliminary image signals are combined based on the maximum signal value and the minimum signal value.

4. The image acquisition apparatus according to claim 1, wherein the noise calculating unit includes:
   a combining-ratio setting unit configured to set a combining percentage which is a combining ratio of the plurality of preliminary image signals; and
   a preliminary combining unit configured to generate a combined preliminary image signal by combining the plurality of preliminary image signals based on the combining ratio; and
   wherein the noise calculating unit calculates the amount of noise or the S/N ratio of the combined preliminary image signal.

5. The image acquisition apparatus according to claim 4, wherein the noise calculating unit further includes:
   an area extracting unit configured to extract a predetermined area centered on an arbitrary target pixel of the combined preliminary image signal; and
   a calculating unit configured to calculate the amount of noise or the S/N ratio of the predetermined area; and
   wherein the noise calculating unit calculates the amount of noise or the S/N ratio of the combined preliminary image signal based on the amount of noise or the S/N ratio of the predetermined area.

6. The image acquisition apparatus according to claim 1, wherein the received-light-level-difference calculating unit includes:
   a weighting unit configured to carry out weighting processing to determine levels of priority of the dynamic range and the amount of noise or the S/N ratio; and
   wherein the received-light-level-difference calculating unit calculates, based on the weighting processing, the received-light-level difference of the image acquisition device among the plurality of actual image signals acquired during the actual image acquisition.

7. The image acquisition apparatus according to claim 6, wherein the weighting unit includes:
   an area extracting unit configured to extract an area of a bright section and an area of a dark section in the preliminary image signal or a combined preliminary image signal; and
   a weighting-coefficient calculating unit configured to calculate a weighting coefficient based on the area of the bright section and the area of the dark section; and
   wherein the weighting unit carries out the weighting processing by multiplying the dynamic range and the S/N ratio by the weighting coefficient.

8. The image acquisition apparatus according to claim 1, wherein the image acquisition unit acquires the plurality of actual image signals acquired through the actual image acquisition based on the received-light-level difference calculated by the received-light-level-difference calculating unit; and
   wherein the image acquisition unit includes an image combining unit configured to generate a combined image signal by combining the plurality of actual image signals.

9. The image acquisition apparatus according to claim 8, further comprising:
   a weight calculating unit configured to calculate a weighting coefficient, which is a combining ratio, of the plurality of actual image signals based on pixel values of the image signals; and wherein the image combining unit generates the combined image signal by weighting and combining the plurality of actual image signals based on the weighting coefficient.

10. A non-transitory computer readable recording medium having an image acquisition program recorded thereon which controls a computer to execute functions comprising:

inputting a plurality of preliminary image signals acquired by carrying out preliminary image acquisition of a subject, before actual image acquisition, with different amounts of light received by an image acquisition device;

calculating a dynamic range for a case in which the plurality of preliminary image signals are combined;

calculating an amount of noise or an S/N ratio for the case in which the plurality of preliminary image signals are combined; and calculating a received-light-level difference of the image acquisition device among a plurality of actual image signals acquired during the actual image acquisition based on the dynamic range and the amount of noise or the S/N ratio;

wherein calculating the received-light-level-difference includes:

generating a first approximate curve of the dynamic range versus the received-light-level difference and a second approximate curve of the S/N ratio versus the received-light-level difference; and calculating an intersection of the first approximate curve and the second approximate curve; and wherein the received-light-level difference at the intersection is calculated as the received-light-level difference of the image acquisition device among the plurality of actual image signals acquired during the actual image acquisition.

* * * * *